G. C. CHANEY.
PROCESS FOR MEASURING THE WEIGHT AND OTHER QUALITIES OF A MATERIAL.
APPLICATION FILED JAN. 30, 1900.
921,083.
Patented May 11, 1909.
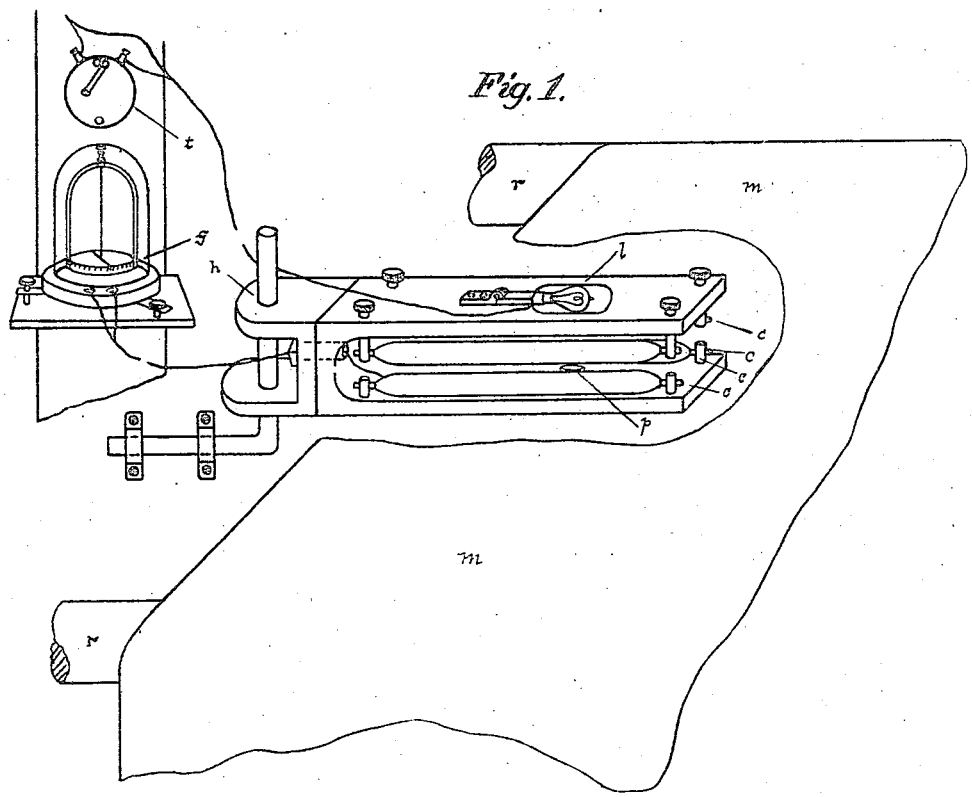
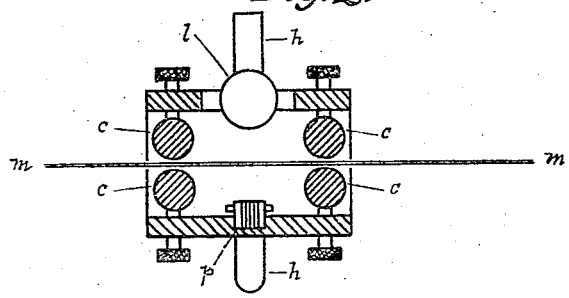
WITNESSES:
Russell A. Sears,
Frederic Read.
INVENTOR
Geo. Carter Chaney.

UNITED STATES PATENT OFFICE.

GEORGE CARTER CHANEY, OF BOSTON, MASSACHUSETTS.

PROCESS FOR MEASURING THE WEIGHT AND OTHER QUALITIES OF A MATERIAL.

No. 921,083.          Specification of Letters Patent.        Patented May 11, 1909.

Application filed January 30, 1900. Serial No. 3,369.

*To all whom it may concern:*

Be it known that I, GEORGE CARTER CHANEY, of Boston, in the county of Suffolk and State of Massachusetts, have invented certain new and useful Improvements in Processes for Measuring the Weight and other Qualities of a Material, of which the following is a specification.

This invention consists of the process for testing a moving material, preferably in sheet form, the constancy in quality or the quality relative to that of a standard sample, which it is desired to ascertain, by subjecting said material to a constant quantity and intensity of energy (preferably heat rays, so called,) of which the transmitter is at a constant distance from the material; by receiving such of the said energy as passes through the said material upon a substance or substances, constant in position, which, in proportion to the effect of the last mentioned energy thereon, become energized, (preferably by its producing an electric current,); and by measuring the said effect of said energy, (and consequently indicating variations in the weight, or thickness, or density, or other quality of the said material,) by a measuring means operated by said receiving substance or substances, (preferably said means being an instrument to measure the above mentioned electric current.)

The essential features of my process for the testing of the weight or other quality of a certain material, whether as to its constancy in said quality when being manufactured or used, or the comparison of the quality of an unknown piece with the quality of a standard sample of the said material, are: 1. The exposing of different portions of said material, or said samples, under identical conditions, to a constant amount of energy. 2. The receiving of such of the said energy as passes through said material upon a quantitatively energizable substance or substances. 3. The operation of a means of quantitative indication by said energized substance or substances, whereby the amounts of the said energy passing through may be compared.

The object of my invention is the quick determination of variations in the weight, thickness, density, polish or other quality of a material.

The description of my process will be more clear by reference to the accompanying drawings, which show a simple arrangement of the instruments used, to none of which, however, do I confine myself.

Figure 1 is a perspective view of the entire mechanism, showing position relative to the sheet of material to be tested. Fig. 2 is a vertical cross-section of a part of the mechanism shown in Fig. 1, at a point including the transmitting and receiving means, and shows the exact position of these features and the sheet of material.

In Fig. 1, $l$ is an electric light, or other producer of radiant heat, $p$, a thermo-pile, so called, or means of producing an electric current, $c, c, c, c$, rollers to keep the sheet of material constant in position, $m$, the sheet of material to be tested, $g$, a galvanometer connected with $p$, $t$, the electric light switch, $r, r$, the rollers of the machine in which the sheet material is manufactured, $h$, a simple hinge by which the entire mechanism may be swung out of the way.

In Fig. 2 similar letters refer to the several parts shown in Fig. 1.

It is a well established law of thermal physics that radiant heat or heat rays, so called, pass instantly through materials with marked diminution. It follows that as less or more of the material is put in the path of the heat rays, the more or less will be transmitted. The process described is for the testing of sheets of a material by measuring the quantity of a constant radiant heat energy transmitted by said material.

Where a sheet of material is made in a machine, the composition may be relied on as constant, and the polish, or external density, as well as the internal density will continue practically the same, since the material is subject to a constant pressure. In such a case the indications will be of thickness, and an increase in thickness will mean that there has been an increase in the amount of material introduced into the machine. In the case of a material like paper, however, an increase of moisture in the incipient sheet combined with an increase of material may result in a product of exactly the same thickness as before this change, but of greatly increased density and therefore of greater weight. Paper being sold as of standard weight therefore requires a measure of weight (i. e. thickness x density) and of this my process is the true indicator, depending as it does upon the amount of the material interposed between transmitter and receiver. Where samples of the same material, not made under identical conditions, are tested by my process a comparison of the resulting indications is such as to show only their relative weights. Where conditions are identical, the resulting indications will show relative thickness.

If the source of heat is liable to fluctuations in intensity, as is the case with that usually supplied by an electric light company, a storage battery or other current regulator may be introduced.

In the use of an ordinary thermopile I prefer, to avoid the possibility of the slight error from the conduction of heat through the elements of the pile, to expose its face to the heat rays for a limited time (say a definite number of seconds) and then make the connection with the galvanometer, or I make the galvanometer connection coincident with the beginning of the exposure,— these methods depending upon the type of these instruments used—and the reading is taken after this fixed time of exposure, when the heat rays should be excluded from the pile to prevent possible overheating and to allow its return to normal.

What I claim as my invention and desire to secure by these Letters Patent, is:—

1. The process of determining the constancy in characteristics of a moving sheet of a material, which consists in the subjection of the surface of said moving sheet, as it passes a given locus, to a constant quantity and quality of energy, in receiving the amount of said energy which passes through said material upon a means, constant in position, to measure said amount, said means having an indicator connected therewith, substantially as specified.

2. The process of determining the constancy in characteristics of a moving strip, which consists in the exposing of the surface of said moving strip, as it passes a given locus, to a constant quantity and quality of heat rays, in receiving the amount of said rays which passes through said strip upon a means, constant in position, to measure said amount, said means having an indicator connected therewith, substantially as specified.

3. The process of determining the constancy in characteristics of a moving piece of a material, which consists in the exposing of the surface of said moving piece, as it passes a given locus, to a constant quantity and quality of heat rays, in receiving the said rays which pass through said material upon a thermopile, so called, constant in position, connected with a galvanometer to measure the mean effect of said last named rays, substantially as specified.

4. The process of determining the constancy in characteristics of a moving sheet of a material, which consists in the subjecting, for equal periods of time and under identical conditions, of sequent points of the surface of said moving sheet to a constant quantity and quality of energy, in receiving the amounts of said energy which pass through said material upon a means of measuring said amounts, said means having an indicator connected therewith, and in comparing the resulting indications, substantially as specified.

5. The process of determining the constancy in characteristics of a moving sheet which consists in the exposing, for equal periods of time and under identical conditions, of sequent points of the surface of said moving sheet to a constant quantity and quality of radiant energy, in receiving the amounts of said energy passing through said sheet upon a means of measuring and forthwith indicating said amounts, and in comparing them, substantially as specified.

6. The process of determining the constancy in characteristics of a moving sheet of a material, which consists in the exposing, for equal periods of time and under identical conditions, of sequent points of the surface of said moving sheet to a constant quantity and quality of heat rays, in receiving the amounts of said rays passing through said material upon a means of measuring and forthwith indicating said amounts, and in comparing them, substantially as specified.

7. The process of testing the similarity in characteristics of two or moving pieces of sheet material, which consists in exposing, under identical conditions, sequent points of the surfaces of said moving pieces to a constant quantity and quality of energy, in receiving the amounts of said energy which pass through said pieces upon a means of measuring and of forthwith indicating said amounts, and in comparing them, substantially as specified.

8. The process of testing the similarity in characteristics of two or more moving portions of sheet material, which consists in exposing, under identical conditions, sequent points of the surfaces of said moving portions to a constant quantity and quality of radiant energy, in receiving the amounts of said energy which pass through said portions upon a means of measuring and of forthwith indicating said amounts, and in comparing them, substantially as specified.

9. The process of testing the similarity in characteristics of two or more moving pieces of sheet material, which consists in exposing, under identical conditions, sequent points of the surfaces of said moving pieces to a constant quantity and quality of heat rays, in receiving the amounts of said rays which pass through said pieces upon a means quantitatively energizable by said rays and operatively connected with an indicator of said energy, and in comparing the readings of the several exposures, substantially as specified.

In testimony whereof I have affixed my signature, in presence of two witnesses.

GEORGE CARTER CHANEY.

Witnesses:
   FREDERIC READ,
   WM. R. BUCKMINSTER.